Jan. 28, 1958    R. R. STROCK ET AL    2,821,695
AIRCRAFT NAVIGATION INSTRUMENT
Filed June 17, 1954    2 Sheets-Sheet 1

INVENTORS
RICHARD R. STROCK
EDWARD R. DAYTON
BY
ATTORNEY

Jan. 28, 1958  R. R. STROCK ET AL  2,821,695
AIRCRAFT NAVIGATION INSTRUMENT
Filed June 17, 1954  2 Sheets-Sheet 2

INVENTORS
RICHARD R. STROCK
EDWARD R. DAYTON
BY
ATTORNEY

United States Patent Office 2,821,695
Patented Jan. 28, 1958

2,821,695

AIRCRAFT NAVIGATION INSTRUMENT

Richard R. Strock, Levittown, and Edward R. Dayton, Huntington Station, N. Y., assignors to Sperry Rand Corporation, a corporation of Delaware Application June 17, 1954, Serial No. 437,485

7 Claims. (Cl. 340—27)

This invention relates generally to aircraft navigation instrumentation and more particularly to a navigation aid for manually piloted aircraft wherein the pilot is relieved of the need of scanning and simultaneously interpreting the information supplied by a number of independent or separately mounted flight instruments. With the instrument of the present invention the pilot is also relieved of the task of anticipating the amount of control demanded by such interpretation and is yet provided with an indication of the information normally supplied by these independent instruments and of the actual amount of craft control applied by the pilot. The present invention relates to a navigational aid for manually piloted aircraft of the type described in application Serial No. 436,169, filed June 11, 1954, in the name of Edmund B. Hammond, Jr., and assigned to the same assignee as the present application and primarily to the attitude indication portion of this type of instrument. Furthermore, both this application and the Hammond application relate to and are improvements over the general type of navigational aid for manually piloted aircraft set forth in detail in U. S. Patent No. 2,613,352, issued to S. Kellogg, 2nd, on October 7, 1952, for a Radio Navigation System, which patent is also assigned to the same assignee as the present application.

The instrument of the present invention not only supplies information which is the result of a combination of attitude, heading and radio information which is combined and correlated to provide a displacement of a minimum number of indicating elements such as, for example, meters of the cross pointer type, but further supplies additional information regarding the actual attitude of the craft when piloted in accordance with the commands of the cross pointers. As set forth in the above Kellogg patent, the cross pointer bars or guidance indicators when symmetrically disposed one with the other relative to a reference index representing the aircraft, the pilot is advised that his craft is flying correctly in accordance with a selected flight plan, although perhaps not on a given or selected flight course. As further stated in the above-mentioned patent, such a plan may call for the use of this indicating system as a flight instrument for "dead-reckoning" flights, or as a radio navigation instrument utilizing radio range system signals, or for making approaches on an instrument landing system (I. L. S.) to an airport under adverse weather conditions. Once a specific flight plan has been selected or chosen, through suitable selector switches, the pilot causes the aircraft to approach and thereafter follow this flight plan by making the indicated attitude changes dictated by the instantaneous deflections of the bars of the cross-pointer indicator. Therefore, to achieve the object of any selected flight plan, it is only necessary for the pilot to follow the dictates of the cross pointer or guidance indicator, interpretation and correlation of the indications of other flight instruments not being necessary.

However, it has been found that although perfectly coordinated flight maneuvers in seeking a selected flight path are achievable by constantly maintaining the guidance pointers symmetrically disposed in the face of the instrument, it has been found preferably desirable to display on the same instrument information representative of the attitude of the craft relative to the horizon which, as set forth in the said Kellogg Patent No. 2,613,352, is the control parameter of the system. With the indicator of the present invention, the information regarding the craft's attitude is displayed relative to the same index against which the guidance indicator is read.

It is, therefore, a primary object of the present invention to provide an improved navigational instrument for enabling a pilot to fly an aircraft on which the instrument is mounted in accordance with a selected flight plan.

It is another object of the present invention to provide a navigational instrument which displays to the pilot not only information which will enable the pilot of the craft to follow a preselected flight plan merely by controlling the attitude of the aircraft in accordance with the indications presented to him by a guidance indicator, the craft being guided, thus to approach and maintain the selected flight plan, but also to supply the pilot information regarding the actual attitude of the craft so controlled, this information being displayed with reference to the same reference index against which the guidance indicators are read.

Another object of the present invention resides in the provision of a navigational instrument which displays to the pilot information as to whether to fly the craft to the right or left and upwardly or downwardly in accordance with the displacement of a pair of azimuth and elevation pointers which are controlled, at least in part, by the roll and pitch attitude of the craft, but also to supply the pilot information as to the magnitude and direction of the craft control in roll and pitch applied by the pilot in responding to the movement of the azimuth and elevation pointers.

Still another object of the present invention resides in the provision of an indicator of the above character in which the information as to the magnitude of direction of the craft control in roll and pitch is supplied to the pilot by means of a stabilized, horizon-defining member which is positioned in accordance with the roll and pitch attitude of the craft by means of a novel and efficient electro-mechanical arrangement which is simple in its operation and easily fabricated.

A more particular object of the present invention resides in the provision of an attitude indicator including means for stabilizing a horizon-defining element or member in accordance with the roll and pitch attitude of the craft which comprises a gimbal upon which the member is pivotally supported for rotation about the roll axis of the craft on which the instrument is mounted and a shaft axially positionable within the gimbal-supporting trunnion which has a coupling between the shaft and the member for rotating the member about the pitch axis upon axial translation of the shaft within the trunnion and a means for positioning the shaft axially within said trunnion in accordance with the pitch attitude of the aircraft.

Generally, the instrument of the present invention comprises an instrument housing having a preferably circular viewing opening in a front wall thereof through which the various movable elements of an instrument may be observed. A guidance indicator is provided which includes a horizontal bar or pointer and a similar vertical bar or pointer movable vertically or horizontally, respectively, across the opening to thereby indicate to the pilot whether to fly the craft upwardly and downwardly and to the right or left. The bars or pointers are displaced in accordance with the outputs of a computer which combine and correlate information regarding the attitude, heading, and radio information in a manner set forth in the above-noted Kellogg patent. As disclosed therein, the pilot flies his craft in accordance with the instantaneous deflections of these guidance indicator bars, and by maintaining them in a symmetrical relation, e. g., zeroed on a reference index, through proper control of the roll and pitch attitude of the craft, the craft will be guided so as to approach and maintain the selected flight path.

Situated directly behind the guidance indicator and also viewable through an opening in the front wall of the instrument is a background for said guidance indicator which includes a movable member disposed adjacent, and in slightly spaced relation to the front wall, of such dimensions that it extends outwardly in all directions beyond the edge of the circular opening. This background member is supported to rotate substantially about the center of said opening as an axis and to move in directions substantially radially of said opening. The background member is further provided with means defining a horizon line substantially subdividing the surface thereof into upper and lower areas, the area above the line being preferably of a light color and the area below the line being of a contrasting or darker color. The background member is stabilized relative to the roll and pitch attitude of the craft on which the instrument is mounted by means of a vertical gyroscope operatively connected therewith. Furthermore, the background member may be provided with a series of relatively vertically disposed marks such as, for example, short horizontal lines and dots spaced one above the other, which when viewed individually relative to the reference index provide an angular pitch scale and when viewed in one embodiment of the present invention, as a whole, define a vertical roll attitude-indicating line.

Thus, in flying the aircraft in accordance with the dictates of the guidance indicators, the pilot will be informed as to the magnitude and direction of craft control in roll and pitch applied by him in responding to the movements of the guidance indicators.

Other objects of the present invention not at this time more particularly enumerated will become clearly apparent from the following detailed description of the exemplary embodiment of this invention when considered in connection with the accompanying drawings, wherein.

Figure 1:
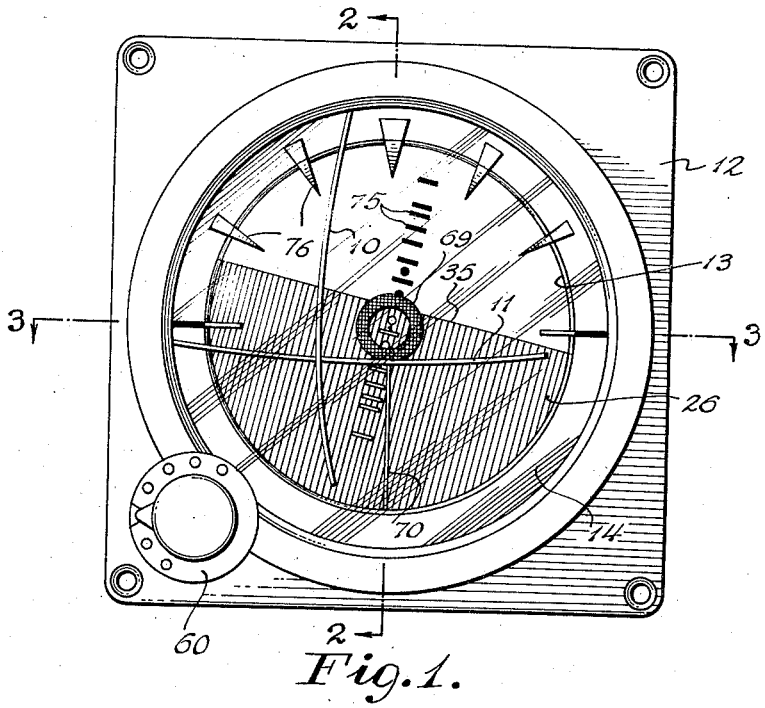
Fig. 1 is a front elevation view of the face of the instrument constructed in accordance with the present invention and indicating a diving left turn.
Figure 2:
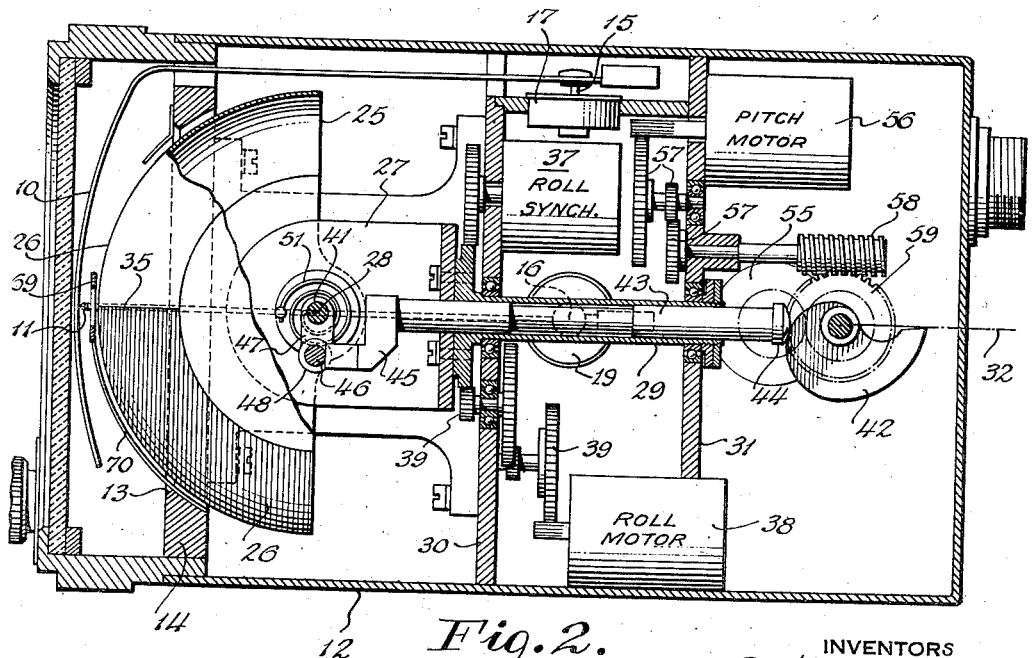
Fig. 2 is a longitudinal section of the instrument of the present invention taken at about the plane defined by lines 2—2 of Fig. 1.
Figure 3:
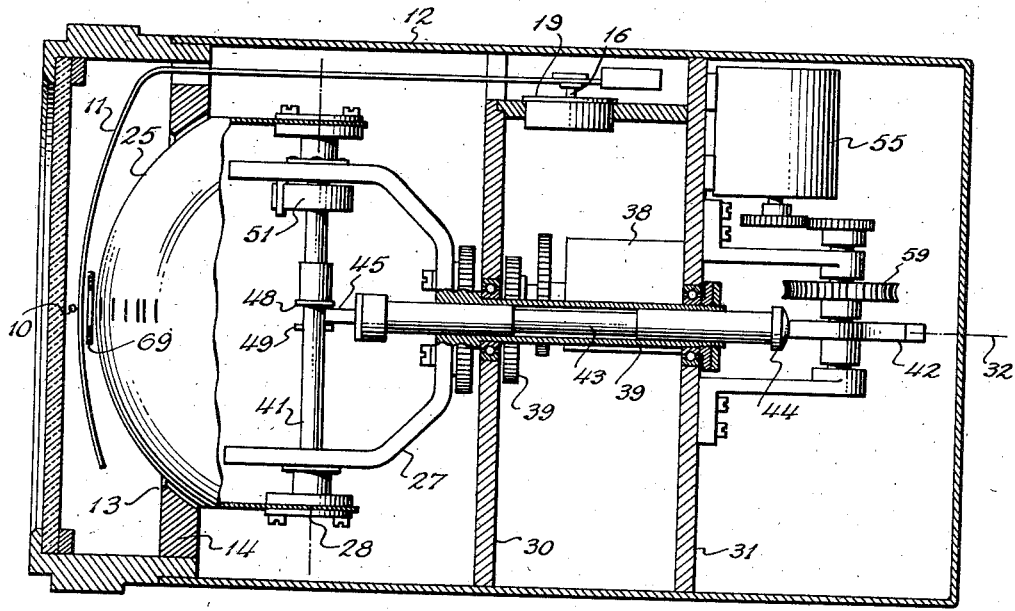
Fig. 3 is a sectional view of the instrument of the present invention taken at about the plane defined by lines 3—3 of Fig. 1.

Referring now to Figs. 1 to 3, inclusive, there is illustrated a preferred embodiment of the present invention in which the azimuth and elevation guidance indicator pointers 10 and 11 are adapted to be respectively pivotally mounted in an instrument housing 12 for movement across a viewing opening 13 in a front wall 14 thereof and relative to a craft reference index 69 supported preferably at the center of the opening 13 on a suitable bracket or curved rod 70. The guidance pointers 10 and 11 are mounted in the instrument housing 12 on pivots 15, 16, respectively. The vertical or azimuth guidance pointer actuating means 17 which may be a galvanometer or similar device is energized, in one mode of operation of the instrument as determined by the position of selector switch 65 and switches 18 (Fig. 4), by an electrical signal corresponding to the algebraic sum of signals proportional to the displacement of the craft from a radio course, such as the localizer beam of an instrument landing system, the heading of the aircraft relative to the bearing of the course, and the bank angle or roll attitude of the craft.

The horizontal or elevation guidance pointer actuating means 19 is energized, depending on the position of the selector switch 65 and switches 18', by an electrical signal corresponding to the vertical displacement of the craft from the glide slope beam of an instrument landing system or from a predetermined altitude, and a signal proportional to the pitch angle or pitch attitude of the craft. The signals operating the guidance indicators 10 and 11 are supplied by the outputs of summing amplifiers and limiters 20 and 21 of Fig. 4 in a manner set forth in detail in the above-identified Kellogg patent. In the illustrated embodiment of the present invention, it will be noted that the pivots 15, 16, for the pointers 10 and 11 are located in the instrument housing preferably at a considerable distance from the front of the instrument so that the movement of the guidance indicators across opening 13 will appear to be substantially parallel to the opening.

The background for guidance indicators 10 and 11 in the illustrated embodiment of the present invention comprises a substantially hemispherical member 25 having its viewable surface 26 disposed adjacent the wall 14 and having a diameter such that the surface thereof extends outwardly or radially in all directions beyond the edge of the circular opening 13. Hemispherical member 25 is pivotally supported on a support member such as a preferably U-shaped gimbal member 27 for relative movement about an axis 28 in the instrument normally parallel to the pitch axis of the aircraft. Gimbal 27 in turn is pivotally supported by means of an elongated trunnion 29 journalled in suitable support walls 30, 31 of the instrument housing 12 for rotation about an axis 32 in the instrument parallel to the roll axis of the craft. Preferably, this axis is coincident with the center of the opening 13 in wall 14. Thus, with the above gimbal construction, the hemispherical member 25 is adapted to be positioned relative to the roll and pitch axis of the aircraft. For the purposes of the present invention, hemispherical member 25 is provided with a horizon-defining line 35 which may be delineated on the surface of the member 25 and which normally subdivides the opening 13 into upper and lower areas relative to index 69, the area above the horizon line being preferably of a light color and the area below the line being of preferably a darker or contrasting color. It will be understood, however, that the means defining a horizon line may take other forms. For example, a generally hemispherically shaped element may be rigidly secured to gimbal 27 and colored in its entirety in a light shade and that a separate, approximately 120° sector of a sphere of slightly larger diameter than the fixed hemisphere may be pivotally supported on the gimbal 27 for movement about the pitch axis over the surface of the fixed hemisphere and colored in a contrasting or dark shade, the edge of the spherical sector being normally positioned relative to the fixed hemispherical element such as to subdivide the opening into upper and lower areas of contrasting colors.

Figure 4:
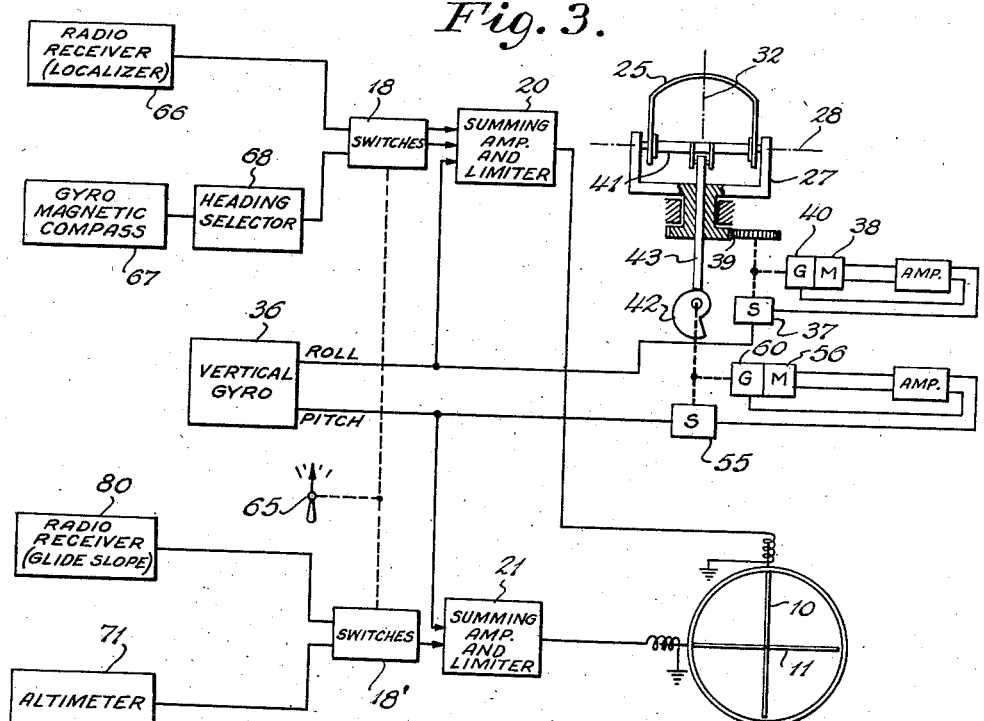
Fig. 4 is a schematic view of a navigation system to which the instrument of the present invention is particularly adaptable.

Gimbal ring 27 and hence, hemispherical member 25 are positioned in accordance with the roll attitude of the craft by means of a positional servo loop between it and a vertical reference which may be a vertical gyro 36 of conventional form as illustrated schematically in Fig. 4. As shown, the roll servo loop comprises a suitable signal generating device such as a synchro transmitter (not shown) on the roll gimbal of vertical gyro 36 electrically coupled with a corresponding synchro 37 associated with gimbal 27, the output signal of roll synchro 37 corresponding to the difference in position between the position of gimbal ring 27 and the horizontal or roll gimbal of vertical gyro 36. This difference signal or error signal is amplified and applied to roll motor 38 which drives gimbal 27 through suitable gearing 39, to thereby zero the signal at roll synchro 37, at which time the gimbal 27 will be exactly aligned with the gyro gimbal. A suitable speed generator 40 may be provided for stabilizing the loop in a conventional manner. Thus, through this roll servo loop, gimbal 27 and hence hemispherical member 25 are positioned in accordance with the roll attitude of the craft as determined by vertical gyro 36.

The pivotal support for hemispherical member 25 on gimbal 27 comprises a shaft 41 journalled in the arms of U-shaped gimbal 27 for rotation about axis 28 normally parallel to the pitch axis of the aircraft. In accordance with the present invention, shaft 41, to which hemispherical member 25 is rigidly attached, is rotated about axis 28 by means of a cam 42 which, in turn, is positioned in accordance with the pitch attitude of the craft as will now be described.

Axially and slidably supported within trunnion 29 is a shaft 43 having a cam follower 44 on one end thereof adapted to engage the surface of cam 42 and having a coupling means at the other end thereof adapted to rotate shaft 41. This coupling means comprises a generally L-shaped arm 45 extending radially from roll axis 32 and adapted to engage a pin 46 (Fig. 2) on the end of a crank arm 47 extending radially from shaft 41 and rigidly secured thereto. Suitable flanges 48 and 49 are provided at each end of pin 46 and embrace the end of radially extending arm 45. Thus, as gimbal 27 rotates about the roll axis 32 in either direction, flanges 48 and 49 will also rotate radial arm 45 and shaft 43 thereby maintaining alignment between pin 46 and arm 45 for all rotational positions of gimbal 27. A suitable coil spring 51 forces pin 46 into engagement with the flat end of arm 45 and thereby maintains cam follower 44 in engagement with the surface of cam 42. Furthermore, it will be noted that the trunnion 29 provides the sole radial support for shaft 43. Upon rotation of cam 42 about its fixed support axis, which in the embodiment illustrated is at right angles with roll axis 32, shaft 43 will be axially translated within trunnion 29 and will impart rotary motion to shaft 41, through arm 45, pin 46, crank arm 47, and hence hemispherical member 25 about pitch axis 28.

The shape of cam 42, of course, determines its lift or throw and, therefore, the character and extent of movement of hemispherical member 25 about pitch axis 28. It has been found that it is desirable to accentuate the movement of horizon-defining line 35 relative to reference 69 for small changes in the pitch attitude of the craft. Furthermore, it may be desirable to reduce the movement of the horizon line 25 as the pitch attitude of the craft increases toward plus or minus 90°. In other words, spherical member 25 need not move through plus or minus 90° when the craft is at a plus or minus 90° attitude. For this purpose, the cam 42 may have a contour such as to provide a lift which is proportional to a non-linear function of the pitch attitude of the craft. However, it is to be understood that the contour of the cam 42 may be so shaped as to provide any desired movement of horizon line 35, relative index 69 or opening 13, either linear with or, as above stated, in accordance with any function of the pitch attitude of the craft.

In order to provide the pilot with a measure of the angle of pitch and angle of roll of the craft as well as pitch and roll attitude as defined by movement of the horizon line 35, the spherical member 25 is provided with a pitch scale comprising a series of short horizontal lines and dots 75 spaced one above the other in a direction perpendicular to horizon line 35. The lines may denote 10° pitch intervals and the dots 5° pitch intervals. Thus, when the lines and dots are viewed individually relative to the reference index 69, the pilot may determine the pitch angle of the craft. Also, as illustrated in Fig. 1, the pitch scale when viewed as a whole defines a vertical roll-attitude indicating line and the pilot may determine the roll angle of the craft by the position of this line relative to the roll reference markings or finger-like indices 76 projecting downwardly into the viewing opening 13 in the front wall 14.

It will be noted that with the above mechanism for imparting rotation of spherical member 25 about the pitch axis 28 no differential or equivalent device is required inasmuch as the means for positioning spherical member 25 about the pitch axis 28 is, in effect, stabilized in roll by means of flanges 48 and 49 and also since the pitch motion of member 25 is imparted through translation of shaft 43 within the gimbal trunnion 29. Thus, a simple, yet efficient, mechanism for positioning spherical member 25 in pitch is provided.

A similar servo loop is employed for positioning the hemispherical members 25 in accordance with the pitch attitude of the craft. Referring again to Fig. 4, pitch synchro 55 is electrically coupled with a suitable pitch signal generating device such as a synchro transmitter (not shown) on vertical gyro 36 and supplies a signal corresponding to the error between the position of hemispherical member 25 about the pitch axis and the pitch attitude of the aircraft as established by vertical gyro 36, this error signal being amplified and supplied to pitch motor 56 securely fixed in the instrument housing which drives cam 42 through suitable reduction gearing 57, worm 58 and worm gear 59 in a direction and an amount to reduce the error signal to zero. Again, a suitable speed generator 60 may be provided for stabilizing the pitch servo loop. Therefore, cam 42, shaft 43 and hence hemispherical member 25 are positioned in accordance with the pitch attitude of the craft.

In the embodiment of the present invention illustrated a pitch trim knob 60 may be provided for adjusting the zero position of elevation guidance pointer 11, member 25 and hence horizon defining line 35, for changes in the loading of the aircraft, i. e., for changes in angle of attack of the craft. For example, pitch trim knob 60 may control a suitable potentiometer which is adapted to insert a bias signal or the like into the summing amplifier and limiter 21 and at the same time into the pitch servo loop between vertical gyro 36 and spherical member 25 in a conventional manner.

The operation of the azimuth and elevation guidance indicators 11 and 12 in response to the signals received from the azimuth signal source 13 and 14 is identical to that described in the above-identified Kellogg patent and a detailed description thereof is deemed not necessary in the present application except to set forth that, with selector switch 65 in a position such as to enable the pilot to approach and maintain a selected radio beam by following the dictates of, say, the vertical pointer, a radio beam displacement signal provided by receiver 66, a signal proportional to the difference between the actual heading of the craft relative to the bearing of the radio beam as determined by compass 67 and heading selector 68, and a roll or bank attitude signal supplied by gyro 36 are algebraically combined in amplifier and limiter 20 in such a manner that the azimuth pointer 10 will remain on reference index 69 not only when the craft is on the radio beam but also when the craft is off the radio beam but in an attitude which will return the craft to the beam in an asymptotic manner. In other words, the vertical guidance pointer 11 is controlled not only in accordance with radio displacement signals, but also in accordance with craft attitude signals, and in particular a roll attitude signal, the latter signal being the control parameter of the system in azimuth whereby by controlling the roll attitude of the craft in accordance with the instantaneous deflections of the vertical or azimuth guidance pointer, the pilot will cause the craft to fly to the right or left, as the case may be, to approach and thereafter follow the selected flight path in azimuth. However, as set forth in detail in the above-identified Hammond application, the pilot is further informed by movement of horizon line 35 behind the pointer 10 of the amount of craft control in roll he has had to apply in order to zero the azimuth pointer 10.

Likewise, and as more fully set forth in the above-identified Kellogg patent, the elevation guidance indicator 11 will be centered on the reference index 69 not only when the craft is on a glide slope radio beam of an I. L. S. system as determined by glide slope receiver 80 or at the desired selected altitude as determined by altimeter 71, as the case may be, but also when the craft is off the glide slope beam or altitude but in a pitch attitude which will return the craft asymptotically to the glide slope beam or to the selected altitude. Again, the pitch attitude of the craft is the controlling parameter of the system in elevation whereby by controlling the pitch attitude of the craft in accordance with the instantaneous deflections of the horizontal or elevation guidance pointers, the pilot will cause the craft to fly up or down, as the case may be, to approach and thereafter maintain the selected flight path in elevation. Again, and as set forth in detail in the above-identified Hammond application, the pilot is informed by movement of the horizon line 35 behind the pointer 11 of the amount of craft control in pitch he has had to apply in order to zero the elevation pointer 11.

While we have described our invention in its preferred embodiments it is to be understood that the words which we have used are words of description rather than of limitation and that changes within the purview of the appended claims may be made without departing from the true scope and spirit of our invention in its broader aspects.

What is claimed is:

1. An attitude indicator for aircraft comprising a housing having an opening in a wall thereof through which the indicating elements may be viewed, a substantially hemispherical member having means cooperable therewith for defining a horizon line thereon normally subdividing said opening into upper and lower areas, a gimbal ring for pivotally supporting said member for rotation about an axis normally parallel to the pitch axis of said aircraft, a hollow trunnion pivotally supporting said gimbal in said housing for rotation about an axis parallel to the roll axis of said aircraft, a shaft slidably and translatably fitted in and radially supported by the inner surface of said hollow trunnion, drive means fixedly mounted in said housing and including means driven thereby and cooperable with one end of said shaft for positioning said shaft axially within said trunnion in accordance with the pitch attitude of said aircraft, and coupling means at the other end of said shaft for imparting rotational movement to said spherical member about said pitch axis in response to the axial position of said shaft.

2. An attitude indicator for aircraft of the character set forth in claim 1 wherein the means driven by said drive means for axially positioning said shaft within said trunnion comprises a cam having an external cam surface pivotally mounted in said housing with said surface abutting said one end of said shaft and positioned in accordance with the pitch attitude of said aircraft.

3. An attitude indicator for aircraft of the character set forth in claim 2 wherein said external cam surface has a contour such that the lift of said shaft is proportional to a non-linear function of the pitch angle of said aircraft.

4. An attitude indicator for aircraft comprising a housing having an opening in a wall thereof through which the indicating elements may be viewed, a substantially hemispherical member having a horizon-defining line thereon normally subdividing said opening into upper and lower areas, a gimbal ring for pivotally supporting said member for rotation about an axis normally parallel to the pitch axis of said aircraft, an elongated, hollow trunnion pivotally supporting said gimbal in said housing for rotation about an axis parallel to the fore and aft axis of said aircraft and aligned with the center of said opening, motive means connected with said gimbal for positioning the same in accordance with the roll attitude of said aircraft, a shaft slidably and translatably fitted within said hollow trunnion and radially supported thereby, coupling means between said shaft and said spherical member for rotating said member about said pitch axis, a cam supported for rotation about a fixed axis in said housing and engaging said shaft for positioning said shaft axially within said trunion, and motive means for driving said cam in accordance with the pitch attitude of said aircraft.

5. In an attitude indicator for aircraft the combination including a member adapted to be positioned in accordance with the roll and pitch attitude of said aircraft, a U-shaped gimbal having an elongated, hollow trunnion for supporting said gimbal for rotation about an axis parallel with the craft roll axis, a first shaft having said member fixed thereto pivotally supported in the arms of said gimbal for rotation about an axis at right angles to said trunnion axis and normally parallel to the craft pitch axis whereby said member may be positioned about said roll axis by said gimbal and about said pitch axis by said first shaft, a second shaft slidably and translatably fitted in said hollow trunnion for supporting the same for movement along said trunnion axis, the length of said second shaft being such that the ends thereof extend beyond the ends of said trunnion, coupling means between one end of said second shaft and said first shaft for converting the translational movement of said second shaft to rotational movement of said first shaft whereby to position said member about said pitch axis, said coupling means imparting rotation to said second shaft with rotation of said trunnion, and a cam having an external cam surface positioned in accordance with the pitch attitude of said craft and located in said housing such that said cam surface abuts the other end of said second shaft whereby to allow relative rotation between said shaft end and said cam surface and simultaneously to impart translational movement to said second shaft in accordance with the pitch attitude of said craft.

6. An attitude indicator for aircraft comprising a housing having an opening in a wall thereof through which the indicating elements may be viewed, a substantially hemispherical member positioned adjacent said opening and having a horizon-defining line thereon normally subdividing said opening into upper and lower areas, a substantially U-shaped gimbal having an elongated, hollow trunnion for supporting said gimbal for rotation about the center of said opening as an axis parallel to the craft roll axis, a first shaft having said hemispherical member fixed thereto pivotally supported in the arms of said gimbal for rotation about an axis at right angles to said trunnion axis and normally parallel to the craft pitch axis whereby said horizon-defining line is adapted to be positioned about the center of said opening by said gimbal and substantially radially of said opening by said first shaft, motive means connected with said gimbal for positioning the hemispherical member in accordance with the roll attitude of said craft, a second shaft slidably and translatably fitted within said hollow trunnion for supporting said shaft for movement along said trunnion axis, the length of said second shaft being such that the ends thereof extend beyond the ends of said trunnion, a cam having an external cam surface and located in said housing such that said surface abuts one end of said second shaft for positioning the same axially within said trunnion and adapted to allow relative rotation between said shaft and said cam surface, means coupling the other end of said second shaft with said first shaft for converting the translational movement of said second shaft to rotational movement of said first shaft and hemispherical member, said coupling means imparting rotation of said second shaft with said trunnion, and motive means for driving said cam in accordance with the pitch attitude of said aircraft.

7. An attitude indicator for aircraft comprising a housing having an opening in a wall thereof through which the indicating elements thereof may be viewed, an attitude indicating member, a gimbal ring, means pivotally mounted in said gimbal for rotation about an axis normally parallel to the craft pitch axis and adapted to move said member in accordance with the pitch attitude of said craft, a hollow trunnion pivotally supporting said gimbal in said housing for rotation about an axis parallel to the craft roll axis for positioning said member about said roll axis, a shaft slidably and translatably fitted in said hollow trunnion for movement along said trunnion axis, the ends of said shaft extending beyond the ends of said trunnion, motion transmitting means coupling one end of said shaft with said gimbal-mounted member-moving means for moving said member in accordance with craft pitch attitude upon translation of said shaft in said trunnion, said coupling means imparting rotation to said shaft upon rotation of said trunnion, a cam having an external cam surface pivotally supported in said housing for movement about an axis substantially parallel to said craft pitch axis and so located in said housing relative to the trunnion axis that said cam surface abuts the other end of said shaft whereby to allow relative rotation between said shaft end and said cam surface and simultaneously to impart translational movement to said shaft in accordance with the pitch attitude of said craft.

References Cited in the file of this patent

UNITED STATES PATENTS

| | | |
|---|---|---|
| 2,227,371 | Von Manteuffel | Dec. 31, 1940 |
| 2,326,835 | Carter | Aug. 17, 1943 |
| 2,423,269 | Summers | July 1, 1947 |
| 2,469,403 | Parker | May 10, 1949 |
| 2,485,552 | Aumuller | Oct. 25, 1949 |
| 2,489,294 | Kenyon | Nov. 29, 1949 |
| 2,696,597 | Chombard | Dec. 7, 1954 |

FOREIGN PATENTS

| | | |
|---|---|---|
| 877,780 | France | Sept. 14, 1942 |